United States Patent
Kalhan et al.

(10) Patent No.: US 11,337,191 B2
(45) Date of Patent: May 17, 2022

(54) INTERFERENCE MITIGATION FOR AERIAL VEHICLE COMMUNICATIONS BY SHARING SCHEDULING INFORMATION WITH NEIGHBORING BASE STATIONS

(71) Applicants: Amit Kalhan, San Diego, CA (US); Henry Chang, San Diego, CA (US); Kyocera Corporation, Kyoto (JP)

(72) Inventors: Amit Kalhan, San Diego, CA (US); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 145 days.

(21) Appl. No.: 16/636,850

(22) PCT Filed: Aug. 10, 2018

(86) PCT No.: PCT/US2018/046172
§ 371 (c)(1),
(2) Date: Feb. 5, 2020

(87) PCT Pub. No.: WO2019/032939
PCT Pub. Date: Feb. 14, 2019

(65) Prior Publication Data
US 2020/0178243 A1    Jun. 4, 2020

Related U.S. Application Data

(60) Provisional application No. 62/672,146, filed on May 16, 2018, provisional application No. 62/544,179, filed on Aug. 11, 2017.

(51) Int. Cl.
*H04W 72/04* (2009.01)
*H04W 72/08* (2009.01)
(Continued)

(52) U.S. Cl.
CPC ....... *H04W 72/0413* (2013.01); *H04L 5/0048* (2013.01); *H04L 27/2678* (2013.01);
(Continued)

(58) Field of Classification Search
CPC ........... H04W 72/042; H04W 72/0413; H04W 72/082
See application file for complete search history.

(56) References Cited

U.S. PATENT DOCUMENTS

2013/0121186 A1 * 5/2013 Vajapeyam ......... H04W 72/085
370/252
2014/0064213 A1   3/2014 Guo et al.
(Continued)

FOREIGN PATENT DOCUMENTS

EP    3633901 A1 * 4/2020 ............. H04L 5/001
KR    20150045987 A * 4/2015

OTHER PUBLICATIONS

Machine Translation of KR20150045987A (retrieved from https://worldwide.espacenet.com), Apr. 29, 2015, 50 pages. (Year: 2015).*
(Continued)

*Primary Examiner* — Hoon J Chung

(57) ABSTRACT

A serving base station allocates communication resources to be used by an aerial vehicle user equipment device (AV-UE) for uplink data transmissions. A neighboring base station is informed, via an air interface, of the communication resources that were allocated to the AV-UE. In some examples, the AV-UE retransmits scheduling assignment information, received from the serving base station, to the neighboring base station. In still other examples, the AV-UE transmits a sounding reference signal (SRS) to the neighboring base station. The neighboring base station can decode the retransmitted scheduling assignment information and/or the SRS to obtain information regarding the communication resources that have been allocated to the AV-UE for uplink
(Continued)

data transmissions. The neighboring base station mitigates interference from the uplink data transmissions sent by the AV-UE.

17 Claims, 6 Drawing Sheets

(51) Int. Cl.
  *H04L 5/00* (2006.01)
  *H04L 27/26* (2006.01)
  *H04W 24/10* (2009.01)
  *H04W 72/12* (2009.01)

(52) U.S. Cl.
  CPC ......... *H04W 24/10* (2013.01); *H04W 72/082* (2013.01); *H04W 72/1231* (2013.01); *H04W 72/1268* (2013.01); *H04W 72/1284* (2013.01); *H04W 72/1289* (2013.01)

(56) References Cited

U.S. PATENT DOCUMENTS

| | | | |
|---|---|---|---|
| 2014/0376398 A1* | 12/2014 | Li | H04L 1/0001 370/252 |
| 2017/0064587 A1* | 3/2017 | Xu | H04W 36/0094 |
| 2020/0037269 A1* | 1/2020 | Ryu | H04B 7/063 |
| 2020/0252941 A1* | 8/2020 | Schmidt | H04W 72/082 |

OTHER PUBLICATIONS

NTT DOCOMO; "Initial views on potential problems and solutions for aerial vehicles," R1-1708433; May 15-19, 2017; 3GPP TSG RAN WG1 #89; Hangzhou, CN.
Huawei, Hisilicon; "Potential enhancements for drones," R1-1707016; May 15-19, 2017; 3GPP TSG RAN WG1 #89; Hangzhou, CN.
Nokia, Alcatel-Lucent Shanghai Bell; "Potential Enhancements for Aerial Vehicles," R1-1707198; May 15-19, 2017; 3GPP TSG RAN WG1 #89; Hangzhou, CN.
LG Electronics; "Potential enhancements for drones," R1-1707580; May 15-19, 2017; 3GPP TSG RAN WG1 #89 Hangzhou, CN.

* cited by examiner

INTERFERENCE MITIGATION FOR AERIAL VEHICLE COMMUNICATIONS BY SHARING SCHEDULING INFORMATION WITH NEIGHBORING BASE STATIONS

CLAIM OF PRIORITY

The present application claims priority to U.S. Provisional Application No. 62/544,179 filed on Aug. 11, 2017, and U.S. Provisional Application No. 62/672,146 filed on May 16, 2018, both entitled "INTERFERENCE MITIGATION FOR AERIAL VEHICLE COMMUNICATIONS BY SHARING SCHEDULING INFORMATION WITH NEIGHBORING BASE STATIONS", and assigned to the assignee hereof.

FIELD

This invention generally relates to wireless communications and more particularly to mitigating interference caused by an aerial vehicle user equipment device.

BACKGROUND

Aerial vehicles (AVs), such as drones, have received increasing interest in the past few years. AVs can be used to perform many different applications, including package delivery, real-time imaging, video surveillance, solar farm inspection, fire and storm assessment, search-and-rescue, monitoring of critical infrastructure, and wildlife conservation. Many of these emerging use cases could benefit from connecting the AV to a cellular network as a user equipment (UE) device.

SUMMARY

A serving base station allocates communication resources to be used by an aerial vehicle user equipment device (AV-UE) for uplink data transmissions. A neighboring base station is informed, via an air interface, of the communication resources that were allocated to the AV-UE. In some examples, the AV-UE retransmits scheduling assignment information, received in an uplink grant from the serving base station, to the neighboring base station. In still other examples, the AV-UE transmits a sounding reference signal (SRS) to the neighboring base station. The neighboring base station can decode the retransmitted scheduling assignment information and/or the SRS to obtain information regarding the communication resources that have been allocated to the AV-UE for uplink data transmissions. The neighboring base station mitigates interference from the uplink data transmissions sent by the AV-UE.

DETAILED DESCRIPTION

There are a number of important considerations when connecting an aerial vehicle (AV) to a network as a user equipment (UE) device. One example of a network to which the AV can be connected is a 3rd Generation Partnership Project (3GPP) Long-Term Evolution (LTE) network. In other examples, the network is a fifth generation wireless system (5G) New Radio network. Regardless of the particular network to which the AV connects, enhancements may be identified to better prepare the cellular networks for the data traffic growth from AVs, such as drones, in the coming years.

For example, an airborne AV that connects to a network as a UE device, referred to herein as an AV-UE, may experience radio propagation characteristics that are likely to be different from those experienced by a typical UE device that operates on the ground. More specifically, when an AV-UE is flying at a low altitude relative to the base station antenna height, the AV-UE behaves like a conventional UE device or terrestrial UE device. However, once the AV-UE is flying well above the base station antenna height, the uplink signal, which is transmitted from the AV-UE, may be received by multiple cells (e.g., base stations) due to line-of-sight propagation conditions.

Thus, the likelihood of the uplink signal from the AV-UE causing interference to neighboring cells increases as the altitude of the AV-UE increases. The increased interference gives a negative impact to the UE devices on the ground (e.g., smartphones, Internet of Things (IoT) devices, etc.). This implies that the network may need to control the connection of AV-UEs in the network so that the perceived throughput performance of the conventional UE devices is not deteriorated.

Based on the above observations, there is a need to mitigate interference from AV-UEs connected to the network by scheduling the AV-UE uplink data transmissions on dedicated communication resources. The examples described herein include a method and a system that address two different scenarios for mitigating the interference caused by AV-UEs. The first scenario involves coordination between the base stations to mitigate interference caused by the AV-UEs. In the second scenario, coordination between the base stations is not available.

Figure 1:
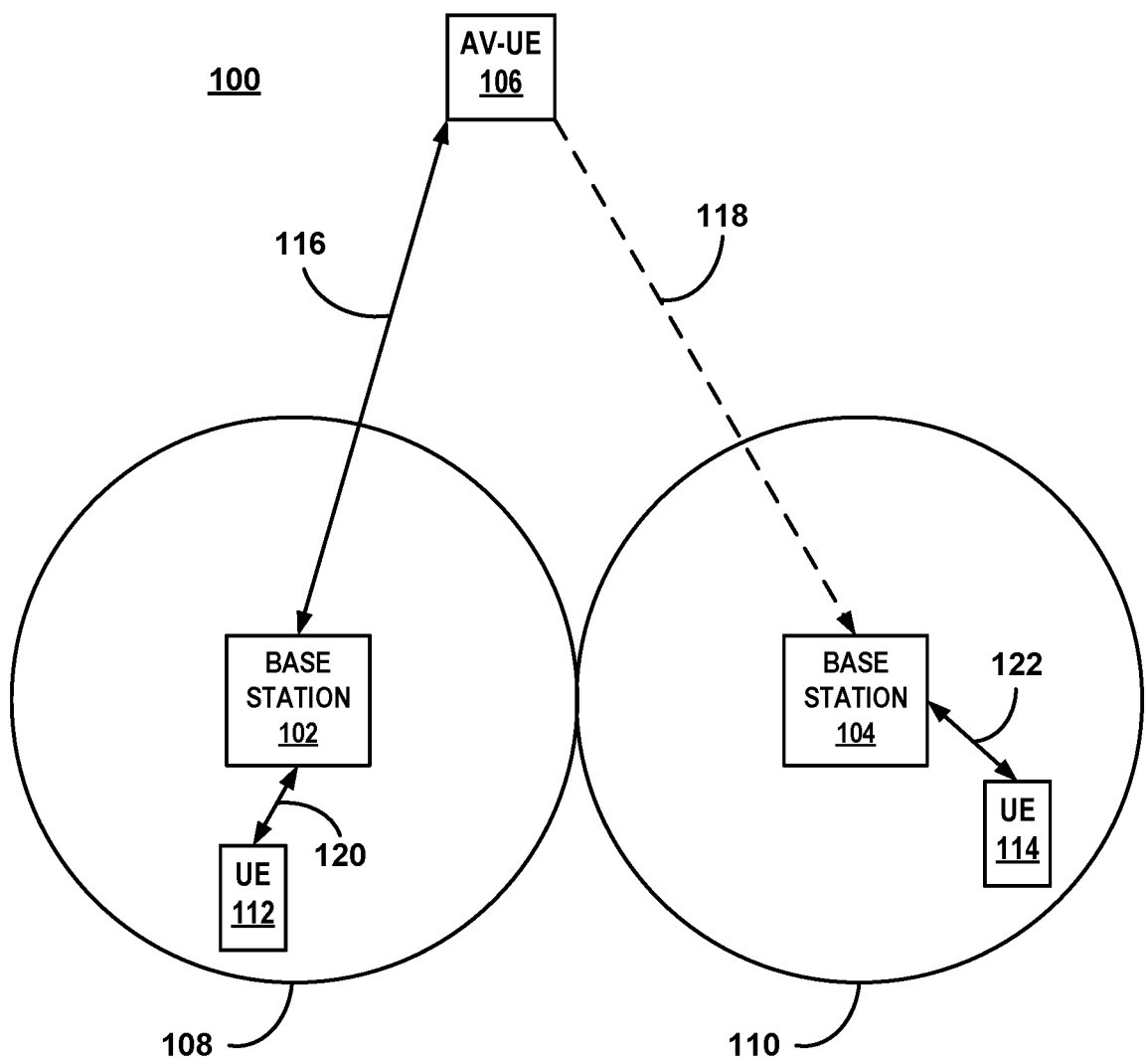
FIG. 1 is a block diagram of a system for an example in which scheduling assignment information for an aerial vehicle user equipment device (AV-UE) is shared, via an air interface, with a neighboring base station to mitigate interference caused by the AV-UE.

FIG. 1 is a block diagram of a communication system for an example in which scheduling information for an aerial vehicle user equipment device (AV-UE) is shared, via an air interface, with a neighboring base station to mitigate interference caused by the AV-UE. The communication system 100 is part of a radio access network (not shown) that provides various wireless services to UE devices that are located within the respective service areas of the various base stations that are part of the radio access network. Base station 102 is connected to the network through a backhaul (not shown) in accordance with known techniques. The base station 102 provides wireless services to UE device 112 and AV-UE 106, which functions as a UE device in the examples herein. The base station 102 communicates with UE device 112 via communication link 120 and with AV-UE 106 via communication link 116.

Although the AV-UE 106 is located above service area 108 of the base station 102 in FIG. 1, base station 102, in this example, is the serving base station for the AV-UE 106. For example, although the service areas 108, 110 are shown as two-dimensional areas in FIG. 1, it is understood that for purposes of providing services to an AV-UE, the service areas actually extend upwards vertically to provide services to AV-UEs that may be located at various altitudes above the service areas shown in FIG. 1. Specifically, the determination of which base station is used to serve the AV-UE 106 in the Connected mode is controlled by the network according to multiple factors such as loading of the neighboring base stations, the base station antenna configurations, and the downlink signal strength measurements reports from the AV-UE 106. In this regard, it is worth noting that, similar to the coverage area that can be provided to traditional, terrestrial UE devices by a base station, the coverage area that can be provided to an AV-UE by a base station can also be affected by distance, environmental conditions, obstructions, and interference.

In the example shown in FIG. 1, communication link 116 is a Uu link between the AV-UE 106 and the base station (eNB) 102. Communication link 116 is configured to provide downlink communication from the base station 102 to the AV-UE 106 and to provide uplink communication from the AV-UE 106 to the base station 102.

In the interest of clarity and brevity, communication system 100 is shown as having only one neighboring base station 104, which provides wireless services to UE device 114 via communication link 122. However, in other examples, communication system 100 could have any suitable number of base stations. In the example shown in FIG. 1, base station 102 is considered to be a serving base station since it is providing wireless services to AV-UE 106. However, neighboring base station 104 is also capable of providing wireless services to the AV-UE 106 via a communication link similar to communication link 116, if the AV-UE 106 is handed over to the neighboring base station 104. If the AV-UE 106 is handed over to neighboring base station 104, then neighboring base station 104 would become the serving base station, and base station 102 would become a neighboring base station. For the purposes of the examples described herein, base stations are considered to be neighboring each other if they are relatively close to each other and/or the AV-UE 106 can simultaneously receive signals from each of the neighboring base stations at a given time.

Base station 102, which is sometimes referred to as an eNodeB or eNB, communicates with the AV-UE 106 by transmitting downlink signals via communication link 116. In the case of 5G based on New Radio, the base station is sometimes referred to as a gNB. Base station 102 also receives uplink signals transmitted from the AV-UE 106 via communication link 116. As used herein, the terms "base station" and "cell" are interchangeable. In some cases, the serving cell is provided by a first base station, and the neighboring cell is provided by a second base station. However, in other cases, a serving cell and a neighboring cell may be provided by the same base station.

Although FIG. 2A specifically depicts the circuitry and configuration of serving base station 102, the same base station circuitry and configuration that is shown and described in connection with serving base station 102 is also utilized for neighboring base station 104, in the example shown in FIG. 1. In other examples, either of the base stations may have circuitry and/or a configuration that differs from that of the serving base station 102 shown in FIG. 2A.

Figure 2A:
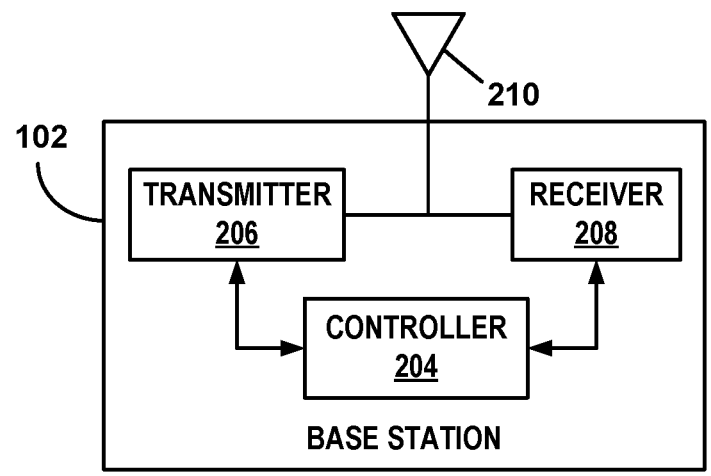
FIG. 2A is a block diagram of an example of the base stations shown in FIG. 1.

As shown in FIG. 2A, base station 102 comprises controller 204, transmitter 206, and receiver 208, as well as other electronics, hardware, and code. The base station 102 is any fixed, mobile, or portable equipment that performs the functions described herein. The various functions and operations of the blocks described with reference to the base station 102 may be implemented in any number of devices, circuits, or elements. Two or more of the functional blocks may be integrated in a single device, and the functions described as performed in any single device may be implemented over several devices.

For the example shown in FIG. 2A, the base station 102 may be a fixed device or apparatus that is installed at a particular location at the time of system deployment. Examples of such equipment include fixed base stations or fixed transceiver stations. In some situations, the base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 102 may be a portable device that is not fixed to any particular location. Accordingly, the base station 102 may be a portable user device such as a UE device in some circumstances.

The controller 204 includes any combination of hardware, software, and/or firmware for executing the functions described herein as well as facilitating the overall functionality of the base station 102. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2A perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the downlink signals to be transmitted via communication link 116 and, in so doing, can apply any one of a plurality of modulation orders. The demodulator demodulates any uplink signals received at the base station 102 in accordance with one of a plurality of modulation orders.

Returning to FIG. 1, the communication system 100 provides various wireless services to the AV-UE 106 via base station 102. For the examples herein, the communication system 100 operates in accordance with at least one revision of the 3rd Generation Partnership Project (3GPP) communication specification. In the example shown in FIG. 2B, the AV-UE 106 circuitry is configured to communicate directly with the base station 102. For example, the AV-UE 106 receives downlink signals via communication link 116 using antenna 212 and receiver 214. The AV-UE 106 transmits uplink signals using transmitter 218 and antenna 212.

Besides antenna 212 and receiver 214, the AV-UE 106 further comprises controller 216 and transmitter 218, as well as other electronics, hardware, and code. The AV-UE 106 is any fixed, mobile, or portable equipment that performs the functions described herein. The various functions and operations of the blocks described with reference to the AV-UE 106 may be implemented in any number of devices, circuits, or elements. Two or more of the functional blocks may be integrated in a single device, and the functions described as performed in any single device may be implemented over several devices.

For the examples described herein, the AV-UE 106 is any wireless communication device that is capable of flight without having a human pilot aboard. In some examples, AV-UE 106 may be attached or mounted to an unmanned aerial vehicle and may be connected to an Evolved Universal Mobile Telecommunications System Terrestrial Radio Access Network (E-UTRAN) when flying and when on the ground. A drone would be one example of AV-UE 106. In the instances where the AV-UE 106 is a drone, the flight of the AV-UE 106 may operate with various degrees of autonomy, either under remote control by a human operator, autonomously by an onboard computer, or autonomously by a remote computer. In other cases, the AV-UE 106 may be a kite whose height can be manually adjusted by a human operator. In still other cases, the AV-UE 106 may be a kite whose height can be adjusted by an adjustable mechanized tether, which can be controlled by a human operator, by a programmed algorithm, or by the AV-UE 106 itself.

The controller 216 of the AV-UE 106 includes any combination of hardware, software, and/or firmware for executing the functions described herein as well as facilitating the overall functionality of a UE device. An example of a suitable controller 216 includes code running on a microprocessor or processor arrangement connected to memory. The transmitter 218 includes electronics configured to transmit wireless signals. In some situations, the transmitter 218 may include multiple transmitters. The receiver 214 includes electronics configured to receive wireless signals. In some situations, the receiver 214 may include multiple receivers. The receiver 214 and transmitter 218 receive and transmit signals, respectively, through antenna 212. The antenna 212 may include separate transmit and receive antennas. In some circumstances, the antenna 212 may include multiple transmit and receive antennas.

Figure 2B:
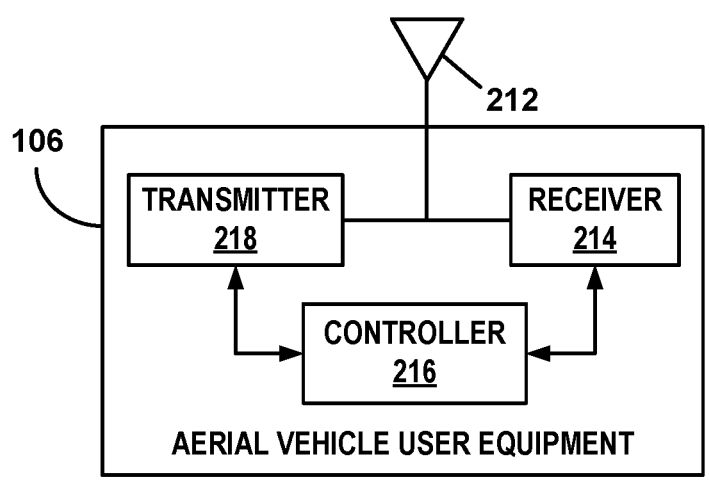
FIG. 2B is a block diagram of an example of the AV-UE shown in FIG. 1.

The transmitter 218 and receiver 214 in the example of FIG. 2B perform radio frequency (RF) processing including modulation and demodulation. The receiver 214, therefore, may include components such as low noise amplifiers (LNAs) and filters. The transmitter 218 may include filters and amplifiers. Other components may include isolators, matching circuits, and other RF components. These components in combination or cooperation with other components perform the UE device functions. The required components may depend on the particular functionality required by the UE device (e.g., AV-UE 106).

The transmitter 218 includes a modulator (not shown), and the receiver 214 includes a demodulator (not shown). The modulator can apply any one of a plurality of modulation orders to modulate signals prior to transmission. The demodulator demodulates received signals in accordance with one of a plurality of modulation orders.

In operation, serving base station 102 provides wireless services to AV-UE 106 via communication link 116. However, due to the altitude at which the AV-UE 106 operates, the uplink transmissions 118 from the AV-UE 106 may cause interference with neighboring base station 104. More specifically, the uplink data transmissions 118 from AV-UE 106 may interfere with the uplink data transmissions being transmitted by the UE device 114 over communication link 122 to the neighboring base station 104. As mentioned above, the examples described herein include a method and a system that address two different scenarios for mitigating the interference caused by AV-UEs. The first scenario involves coordination between the base stations to mitigate interference caused by the AV-UEs. In the second scenario, coordination between the base stations is not available.

In connection with the first scenario in which the base stations coordinate to mitigate interference caused by the AV-UE 106, the serving base station 102 allocates communication resources to the AV-UE 106 for uplink data transmissions and informs, via an air interface, the neighboring base station 104 of the communication resources that were allocated to the AV-UE 106. This allocation of communication resources can be pre-defined in deployment parameters or dynamically allocated by the serving base station 102. In the examples in which the communication resources are dynamically allocated, the serving base station 102 selects the communication resources based on uplink signal quality measurements and/or downlink measurement reports sent by the AV-UE 106.

FIGS. 3A-3D depict the signals that are transmitted between the AV-UE 106, the serving base station 102, and a neighboring base station 104, according to several different examples in which the neighboring base station 104 is informed of the communication resources allocated to the AV-UE 106. In the interest of clarity and brevity, not all of the messages that are transmitted between the AV-UE 106 and the base stations 102, 104 are included in FIGS. 3A-3D. Moreover, one or more of the messages that are shown in FIGS. 3A-3D may be omitted. Likewise, additional messages may be included beyond those shown in FIGS. 3A-3D that facilitate the serving base station 102 allocating communication resources to the AV-UE 106 and informing the neighboring base station 104 regarding the communication resources that were allocated to the AV-UE 106. Furthermore, the various signals shown in FIGS. 3A-3D may be combined with each other and/or substituted in any suitable manner that facilitates the serving base station 102 allocating communication resources to the AV-UE 106 and informing the neighboring base station 104 regarding the communication resources that were allocated to the AV-UE 106.

Figure 3A:
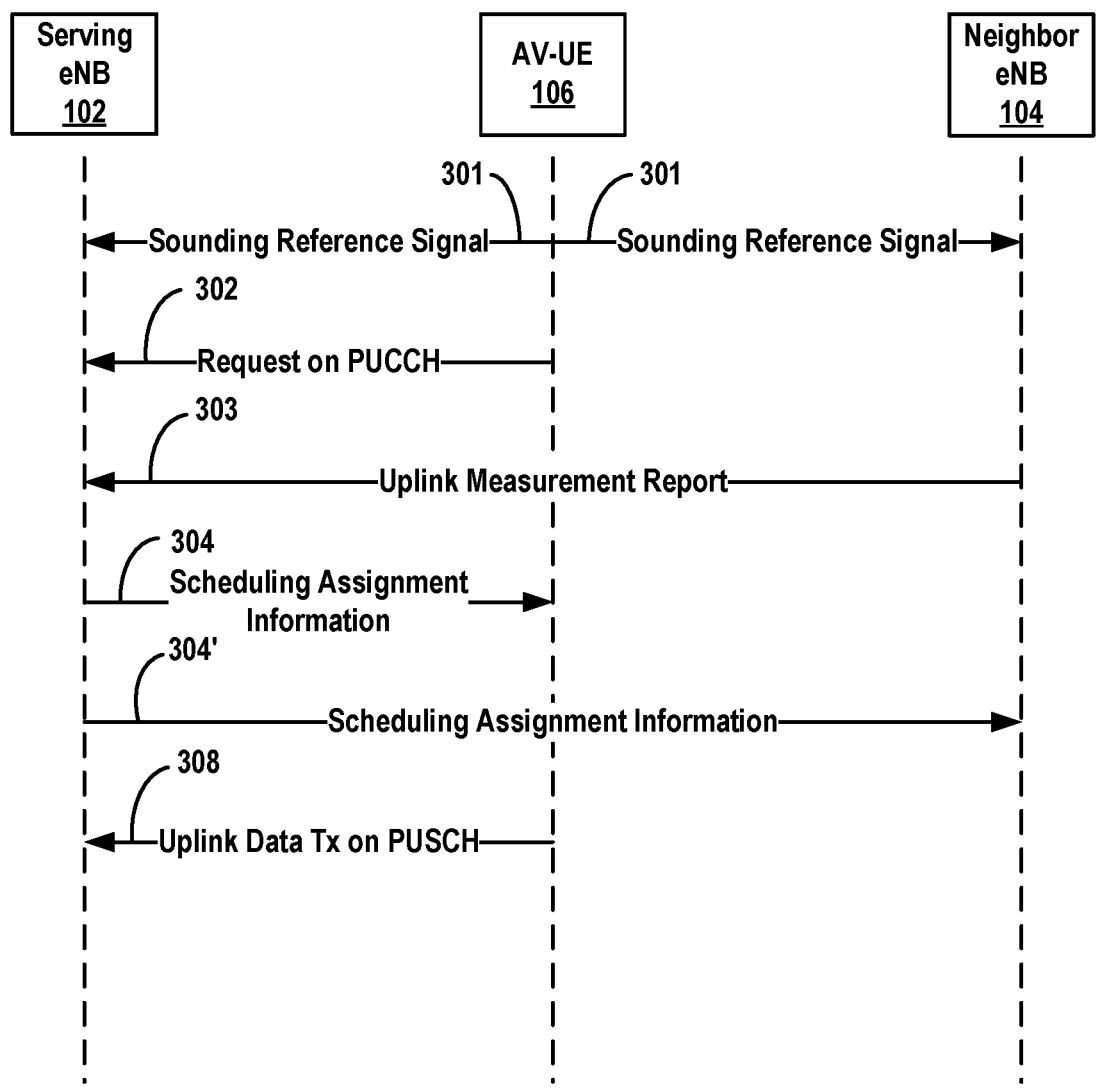
FIG. 3A is a messaging diagram of an example in which a serving base station dynamically allocates communication resources to the AV-UE based on at least one uplink measurement report received from at least one neighboring base station.

FIG. 3A is a messaging diagram of an example in which the serving base station 102 dynamically allocates communication resources to the AV-UE 106 based on at least one uplink measurement report received from neighboring base station 104. The AV-UE 106 transmits, via transmitter 218 and antenna 212, a sounding reference signal (SRS) to the serving base station 102 and the neighboring base station 104. The base stations 102, 104 receive the SRS via their respective antennas 210 and receivers 208. The signal containing the SRS is represented in FIG. 3A by signal 301. Although the SRS transmissions in FIG. 3A are shown as a single transmission that is sent to both base stations 102, 104, the AV-UE 106 may send separate SRS transmissions to the base stations 102, 104, in other examples. In still other examples, the neighboring base station 104 can be configured to monitor any suitable uplink transmissions (e.g., Physical Uplink Control Channel (PUCCH), Physical Uplink Shared Channel (PUSCH), Random-Access Channel (RACH), Reference Signal, etc.) from the AV-UE 106. Thus, the neighboring base station 104 can measure the SRS or any other uplink signal for the uplink measurement report.

In the example shown in FIG. 3A, the AV-UE 106 transmits a request, via transmitter 218 and antenna 212, for communication resources to the serving base station 102 on the Physical Uplink Control Channel (PUCCH). The serving base station 102 receives the request via its antenna 210 and receiver 208. The signal containing the request is represented in FIG. 3A by signal 302. In other examples, the request can be transmitted as part of a data transmission on the PUSCH.

The neighboring base station 104 coordinates with the serving base station 102 regarding the scheduling of uplink resources, typically over the X2 interface, which includes an uplink measurement report represented in FIG. 3A by signal 303. The uplink measurement report contains information (e.g., signal strength/quality) regarding an uplink signal (e.g., SRS 301 or any other uplink signal) received from the AV-UE 106. Signal 303 should at least contain information regarding the source of the uplink interference (e.g., the identity of the AV-UE 106). Although the uplink measurement report 303 is transmitted after the request 302 in FIG. 3A, the uplink measurement report 303 may be transmitted before the request 302 and/or in response to a request for an uplink measurement report from the serving base station 102, in other examples.

Upon receipt of the request 302 and the uplink measurement report 303, the controller 204 of the serving base station 102 selects the communication resources to be allocated to the AV-UE 106 based at least partially upon the uplink measurement report 303 (e.g., uplink signal quality measurements) taken by the neighboring base station 104. In other examples, the serving base station 102 may also consider its own uplink measurements of signals received from the AV-UE 106 and/or uplink measurement reports from one or more additional neighboring base stations when selecting the communication resources to allocate to the AV-UE 106. The serving base station 102 transmits, via transmitter 206 and antenna 210, a scheduling assignment information signal on the Physical Downlink Control Channel (PDCCH) to the AV-UE 106. The AV-UE 106 receives the scheduling assignment information signal via antenna 212 and receiver 214. The neighboring base station 104 receives the scheduling assignment information signal via its antenna 210 and receiver 208. The scheduling assignment information signal contains information regarding the communication resources that have been allocated to the AV-UE 106 for uplink data transmissions. The signal containing the scheduling assignment information is represented in FIG. 3A by signal 304. Although the transmission of signal 304 is shown as separate transmissions 304, 304' to AV-UE 106 and the neighboring base station 104, respectively, in FIG. 3A, the serving base station 102 may transmit the scheduling assignment information signal 304 as a single transmission to the AV-UE 106 and the neighboring base station 104, in other examples. In some cases, the transmission of the scheduling assignment information signal 304' to the neighboring base station 104 occurs over a wireless-based X2protocol.

Upon receipt of the scheduling assignment information signal 304, the AV-UE 106 begins transmitting uplink data transmissions, via the Physical Uplink Shared Channel (PUSCH), using the communication resources specified in the scheduling assignment information signal 304. The AV-UE 106 transmits the uplink data transmissions via transmitter 218 and antenna 212, and the serving base station 102 receives the uplink data transmissions via its antenna 210 and receiver 208. The signals containing the uplink data transmissions are represented in FIG. 3A by signal 308.

Figure 3B:
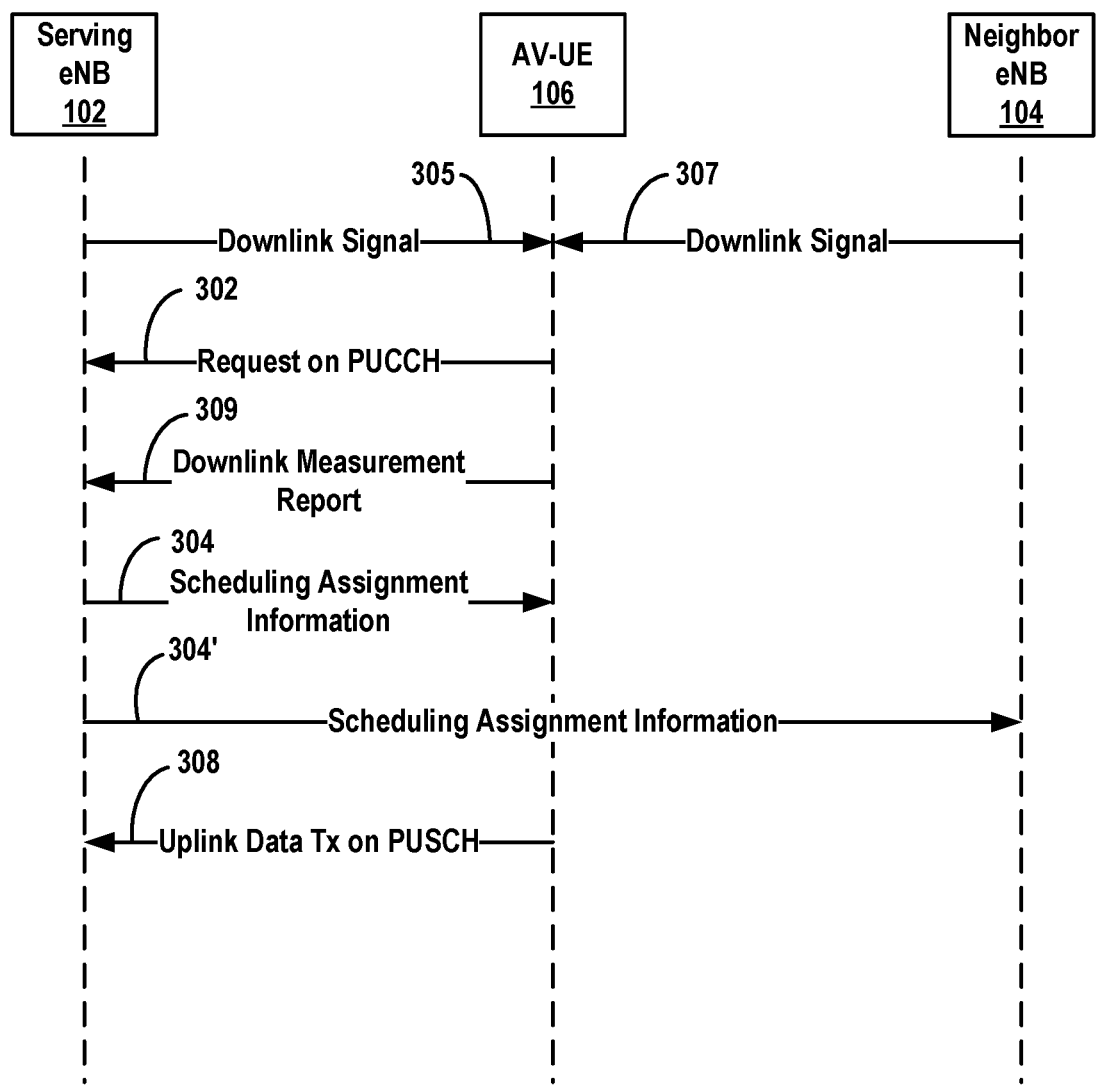
FIG. 3B is a messaging diagram of an example in which a serving base station dynamically allocates communication resources to the AV-UE based on a downlink measurement report received from the AV-UE.

FIG. 3B is a messaging diagram of an example in which a serving base station 102 dynamically allocates communication resources to the AV-UE 106 based on a downlink measurement report received from the AV-UE 106. The serving base station 102 transmits, via its transmitter 206 and antenna 210, a downlink signal to the AV-UE 106. The neighboring base station 104 transmits, via its transmitter 206 and antenna 210, a downlink signal to the AV-UE 106. The AV-UE 106 receives the downlink signals from both base stations 102, 104 via antenna 212 and receiver 214. The signal containing the downlink signal from the serving base station 102 is represented in FIG. 3B by signal 305. The signal containing the downlink signal from the neighboring base station 104 is represented in FIG. 3B by signal 307. Although the downlink signals 305, 307 in FIG. 3B are shown as being transmitted at the same time to AV-UE 106, the base stations 102, 104 may send the downlink signals 305, 307 to the AV-UE 106 at different times, in other examples.

The AV-UE 106 transmits a request, via transmitter 218 and antenna 212, for communication resources to the serving base station 102 on the Physical Uplink Control Channel (PUCCH). The serving base station 102 receives the request via its antenna 210 and receiver 208. The signal containing the request is represented in FIG. 3B by signal 302.

The AV-UE 106 transmits, via transmitter 218 and antenna 212, a downlink measurement report to the serving base station 102. The serving base station 102 receives the downlink measurement report via its antenna 210 and receiver 208. The signal containing the downlink measurement report is represented in FIG. 3B by signal 309. The downlink measurement report 309 contains information (e.g., signal strength/quality) regarding at least one of the downlink signals 305, 307 received by the AV-UE 106. In the example of FIG. 3B, a single downlink measurement report 309 is shown that contains information regarding both downlink signal 305 and downlink signal 307. However, in other examples, the downlink measurement report 309 may contain information regarding a single downlink signal, or in still other examples, separate downlink measurement reports 309 may be sent for each of the downlink signals 305, 307. Moreover, although the downlink measurement report 309 is transmitted after the request 302 in FIG. 3B, the downlink measurement report 309 may be transmitted before the request 302 and/or in response to a request for a downlink measurement report from the serving base station 102, in other examples.

Upon receipt of the request 302 and the downlink measurement report 309, the controller 204 of the serving base station 102 selects the communication resources to be allocated to the AV-UE 106 based at least partially upon the downlink measurement report 309 (e.g., downlink signal quality measurements) taken by the AV-UE 106. In other examples, the serving base station 102 may also consider downlink measurement reports from one or more additional UE devices when selecting the communication resources to allocate to the AV-UE 106. The serving base station 102 transmits, via transmitter 206 and antenna 210, a scheduling assignment information signal on the Physical Downlink Control Channel (PDCCH) to the AV-UE 106. The AV-UE 106 receives the scheduling assignment information signal via antenna 212 and receiver 214. The serving base station also transmits, either via a wired connection or a wireless connection, the scheduling assignment information to the neighboring base station 104. The scheduling assignment information signal contains information regarding the communication resources that have been allocated to the AV-UE 106 for uplink data transmissions. The signal containing the scheduling assignment information transmitted to the AV-UE 106 is represented in FIG. 3B by signal 304. Although the transmission of signal 304 is shown as separate transmissions 304, 304' to AV-UE 106 and the neighboring base station 104, respectively, in FIG. 3B, the serving base station 102 may transmit the scheduling assignment information signal 304 as a single transmission to the AV-UE 106 and the neighboring base station 104, in other examples. In some cases, the transmission of the scheduling assignment information signal 304' to the neighboring base station 104 occurs over a wireless-based X2 protocol.

Upon receipt of the scheduling assignment information signal 304, the AV-UE 106 begins transmitting uplink data transmissions, via the Physical Uplink Shared Channel (PUSCH), using the communication resources specified in the scheduling assignment information signal 304. The AV-UE 106 transmits the uplink data transmissions via transmitter 218 and antenna 212, and the serving base station 102 receives the uplink data transmissions via its antenna 210 and receiver 208. The signals containing the uplink data transmissions are represented in FIG. 3B by signal 308.

In connection with the second scenario in which coordination between the base stations 102, 104 is not available, the AV-UE 106 must inform the neighboring base station 104 of the communication resources that were allocated to the AV-UE 106 to mitigate interference caused by the AV-UE 106.

Figure 3C:
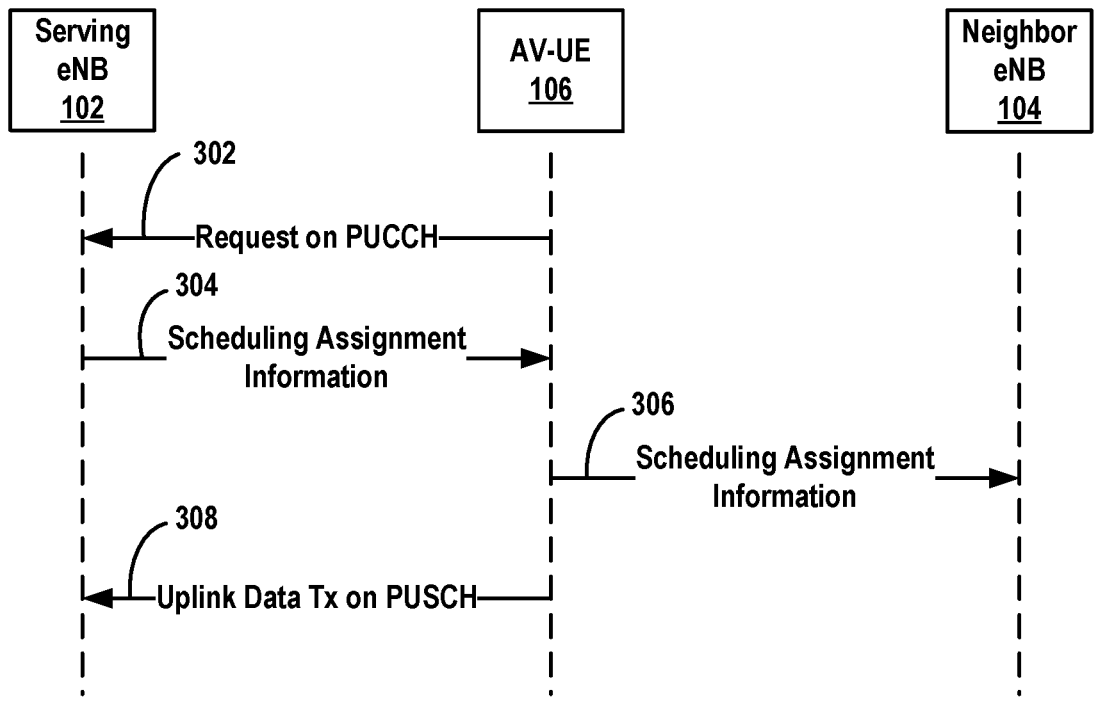
FIG. 3C is a messaging diagram of an example in which the AV-UE transmits scheduling assignment information regarding the communication resources that were allocated to the AV-UE to the neighboring base station.

FIG. 3C is a messaging diagram of an example in which the AV-UE 106 transmits scheduling assignment information regarding the communication resources that were allocated to the AV-UE 106 to the neighboring base station 104. The AV-UE 106 transmits a request, via transmitter 218 and antenna 212, for communication resources to the serving base station 102 on the Physical Uplink Control Channel (PUCCH). The serving base station 102 receives the request via its antenna 210 and receiver 208. The signal containing the request is represented in FIG. 3C by signal 302.

Upon receipt of the request 302, the controller 204 of the serving base station 102 selects the communication resources to be allocated to the AV-UE 106. The serving base station 102 transmits, via transmitter 206 and antenna 210, a scheduling assignment information signal on the Physical Downlink Control Channel (PDCCH) to the AV-UE 106. The AV-UE 106 receives the scheduling assignment information signal via antenna 212 and receiver 214. The scheduling assignment information signal contains information regarding the communication resources that have been allocated to the AV-UE 106 for uplink data transmissions. The signal containing the scheduling assignment information is represented in FIG. 3C by signal 304.

Upon receipt of the scheduling assignment information signal 304, the AV-UE 106 retransmits, via transmitter 218 and antenna 212, the scheduling assignment information to the neighboring base station 104 on the Physical Uplink Control Channel (PUCCH) or on the Physical Uplink Shared Channel (PUSCH) as a data message. The neighboring base station 104 receives the retransmitted scheduling assignment information signal via its antenna 210 and receiver 208. The signal containing the retransmitted scheduling assignment information is represented in FIG. 3C by signal 306. In some examples, at least one of the following is added to the retransmitted scheduling assignment information signal 306: a preamble, an additional reference signal, an extended cyclic prefix, and a timing advance. These changes are added to the signal 306 to communicate with the neighboring base station 104 because the channel conditions of the link between the AV-UE 106 and neighboring base station 104 could be different than the link between the AV-UE 106 and the serving base station 102.

The AV-UE 106 begins transmitting uplink data transmissions, via the Physical Uplink Shared Channel (PUSCH), using the communication resources specified in the scheduling assignment information signal 304. The AV-UE 106 transmits the uplink data transmissions via transmitter 218 and antenna 212, and the serving base station 102 receives the uplink data transmissions via its antenna 210 and receiver 208. The signals containing the uplink data transmissions are represented in FIG. 3C by signal 308.

Figure 3D:
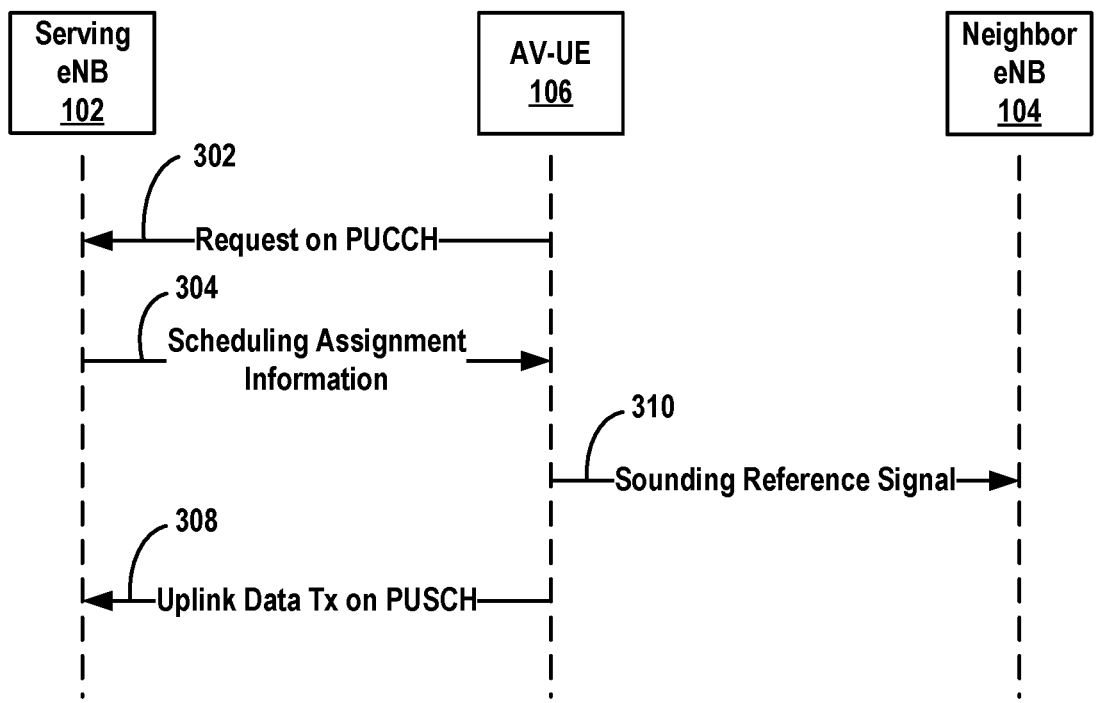
FIG. 3D is a messaging diagram of an example in which the AV-UE transmits a sounding reference signal (SRS) to the neighboring base station so that the neighboring base station can decode the SRS to obtain scheduling assignment information regarding the communication resources allocated to the AV-UE.

FIG. 3D is a messaging diagram of an example in which the AV-UE 106 transmits a sounding reference signal (SRS) to the neighboring base station 104 so that the neighboring base station 104 can decode the SRS to obtain scheduling assignment information regarding the communication resources allocated to the AV-UE 106. The AV-UE 106 transmits a request, via transmitter 218 and antenna 212, for communication resources to the serving base station 102 on the Physical Uplink Control Channel (PUCCH). The serving base station 102 receives the request via its antenna 210 and receiver 208. The signal containing the request is represented in FIG. 3D by signal 302.

Upon receipt of the request 302, the controller 204 of the serving base station 102 selects the communication resources to be allocated to the AV-UE 106. The serving base station 102 transmits, via transmitter 206 and antenna 210, a scheduling assignment information signal on the Physical Downlink Control Channel (PDCCH) to the AV-UE 106. The AV-UE 106 receives the scheduling assignment information signal via antenna 212 and receiver 214. The scheduling assignment information signal contains information regarding the communication resources that have been allocated to the AV-UE 106 for uplink data transmissions. The signal containing the scheduling assignment information is represented in FIG. 3D by signal 304.

Upon receipt of the scheduling assignment information signal 304, the AV-UE 106 transmits, via transmitter 218 and antenna 212, a sounding reference signal (SRS) to the neighboring base station 104. The neighboring base station 104 receives the SRS via its antenna 210 and receiver 208. The signal containing the SRS is represented in FIG. 3D by signal 310. In some examples, the AV-UE 106 transmits the SRS using a set of subcarriers that will be used by the AV-UE 106 for an upcoming uplink data transmission. In other examples, the AV-UE 106 transmits the SRS using a specific sequence that implicitly conveys information regarding the communication resources that will be used by the AV-UE 106 for an upcoming uplink data transmission. Regardless of the exact content of the SRS, the neighboring base station 104 decodes the SRS to obtain scheduling assignment information regarding the communication resources to be used by the AV-UE 106 for uplink data transmissions.

The AV-UE 106 begins transmitting uplink data transmissions, via the Physical Uplink Shared Channel (PUSCH), using the communication resources specified in the scheduling assignment information signal 304. The AV-UE 106 transmits the uplink data transmissions via transmitter 218 and antenna 212, and the serving base station 102 receives the uplink data transmissions via its antenna 210 and receiver 208. The signals containing the uplink data transmissions are represented in FIG. 3D by signal 308.

As shown above, the neighboring base station 104 can receive information regarding the communication resources that were allocated to the AV-UE 106 either from the serving base station 102 or from the AV-UE 106. In either case, the neighboring base station 104 can use the received information to mitigate interference caused by uplink data transmissions sent by the AV-UE 106. For example, the neighboring base station 104 may choose not to use the communication resources allocated to the AV-UE 106 when scheduling its own UE devices (e.g., UE device 114) or may only schedule low priority communications (e.g., low Quality of Service communications) to use the communication resources allocated to the AV-UE 106. In addition, the neighboring base station 104 can modify its antenna beam pattern to steer away from the AV-UE 106. Likewise, the serving base station 102 can steer its antenna beam pattern towards the AV-UE 106.

Figure 4:
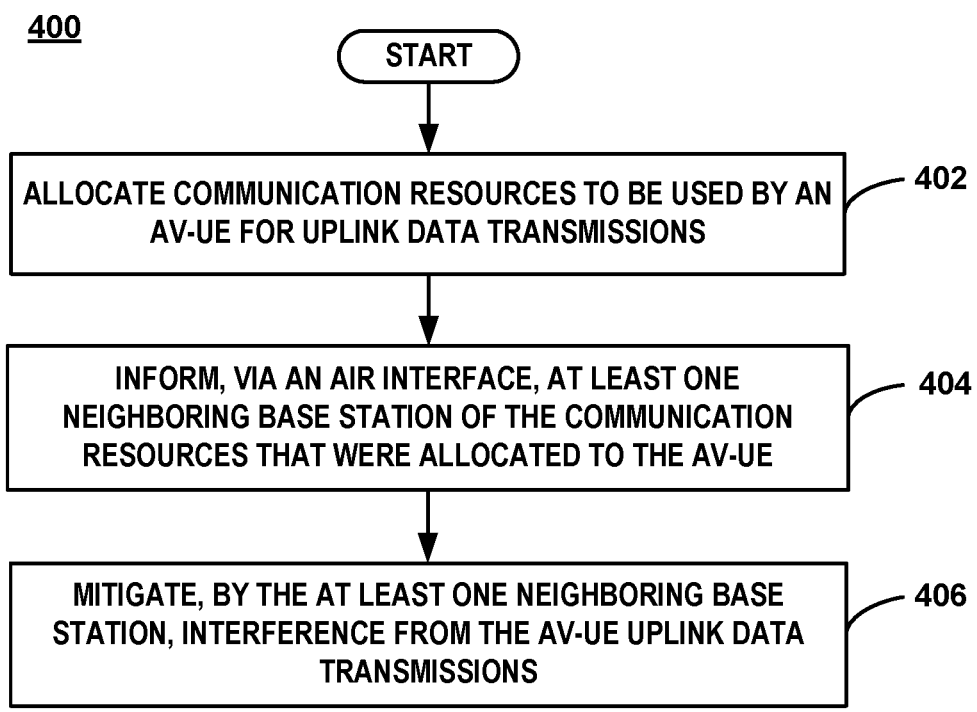
FIG. 4 is a flowchart of an example of a method in which scheduling assignment information for an AV-UE is shared, via an air interface, with a neighboring base station to mitigate interference caused by the AV-UE.

FIG. 4 is a flowchart of an example of a method in which scheduling assignment information for an AV-UE 106 is shared, via an air interface, with a neighboring base station 104 to mitigate interference caused by the AV-UE 106. The steps of method 400 may be performed in a different order than described herein and shown in the example of FIG. 4. Furthermore, in some examples, one or more of the steps may be omitted. Moreover, in other examples, one or more additional steps may be added. In some cases, multiple steps may be performed in parallel.

In the example shown in FIG. 4, the method 400 begins at step 402, in which a serving base station 102 allocates communication resources to be used by an AV-UE 106 for uplink data transmissions. In some cases, the communication resources are pre-defined. In other cases, the communication resources are dynamically allocated based on uplink measurement reports received from at least one neighboring base station 104 and/or downlink measurement reports received from the AV-UE 106.

At step 404, the neighboring base station 104 is informed, via an air interface, of the communication resources that were allocated to the AV-UE 106. In some examples, the serving base station 102 transmits, either via a wired connection or a wireless connection, scheduling assignment information regarding the communication resources allocated to the AV-UE 106 to the neighboring base station 104. In other examples, the AV-UE 106 retransmits a scheduling assignment information signal received from the serving base station 102 to the neighboring base station 104. In still other examples, the AV-UE 106 transmits a sounding reference signal (SRS) to the neighboring base station 104. The neighboring base station 104 can decode the retransmitted scheduling assignment information signal and/or the SRS to obtain information regarding the communication resources that have been allocated to the AV-UE 106 for uplink data transmissions. At step 406, the neighboring base station 104 mitigates interference from the uplink data transmissions sent by the AV-UE 106, as described above.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   receiving, at a serving base station from a neighboring base station, an uplink measurement report based on uplink signal quality measurements taken by the neighboring base station on an uplink signal transmitted by an aerial vehicle user equipment device (AV-UE) being served by the serving base station;
   allocating, by the serving base station, communication resources of a Physical Uplink Shared Channel (PUSCH) to be used by the AV-UE for uplink data transmissions, the allocating based at least partially on the uplink measurement report received from the neighboring base station; and
   transmitting, from the serving base station to the neighboring base station via an air interface, scheduling assignment information identifying the communication resources that were allocated to the AV-UE.

2. The method of claim 1, further comprising:
   selecting the communication resources based on downlink measurement reports sent by the AV-UE.

3. The method of claim 1, further comprising:
   transmitting, by the AV-UE, scheduling assignment information regarding the communication resources to the neighboring base station.

4. The method of claim 3, wherein transmitting scheduling assignment information comprises adding at least one of the following to a transmission of the scheduling information: a preamble, an additional reference signal, an extended cyclic prefix, and a timing advance.

5. The method of claim 1, further comprising:
   transmitting, by the AV-UE, a sounding reference signal (SRS) to the neighboring base station; and
   decoding, by the neighboring base station, the SRS to obtain scheduling assignment information regarding the communication resources to be used by the AV-UE for uplink data transmissions.

6. The method of claim 5, wherein transmitting the SRS comprises:
   transmitting the SRS using a set of subcarriers that will be used for an upcoming uplink data transmission.

7. The method of claim 5, wherein transmitting the SRS comprises:
   transmitting a specific sequence that implicitly conveys information regarding the communication resources that will be used for an upcoming uplink data transmission.

8. The method of claim 1, further comprising:
   mitigating, by the neighboring base station, interference from the AV-UE uplink data transmissions.

9. A serving base station comprising:
   a receiver configured to receive, from a neighboring base station, an uplink measurement report based on uplink signal quality measurements taken by the neighboring base station on an uplink signal transmitted by an aerial vehicle user equipment device (AV-UE) being served by the serving base station;
a controller configured to allocate, based at least partially on the uplink measurement report received from the neighboring base station, communication resources to be used by the AV-UE for uplink data transmissions, the communication resources being specific communication resources of a Physical Uplink Shared Channel (PUSCH); and
a transmitter configured to transmit, to the neighboring base station via an air interface, scheduling assignment information identifying the communication resources that were allocated to the AV-UE.

10. The serving base station of claim 9, wherein the controller is further configured to select the communication resources based on downlink measurement reports sent by the AV-UE.

11. An aerial vehicle user equipment device (AV-UE) comprising:
a transmitter configured to transmit an uplink signal to a neighboring base station configured to transmit, to a serving base station serving the AV-UE, an uplink measurement report based on uplink signal quality measurements taken by the neighboring base station on the uplink signal, the serving base station configured to allocate, based at least partially on the uplink measurement report received from the neighboring base station, communication resources to be used by the AV-UE for uplink data transmissions, the communication resources being specific communication resources of a Physical Uplink Shared Channel (PUSCH); and
a receiver configured to receive, from the serving base station, scheduling assignment information, sent to both the AV-UE and the neighboring base station, the scheduling assignment information identifying the communication resources that were allocated to the AV-UE.

12. The AV-UE of claim 11, wherein the transmitter is further configured to transmit a sounding reference signal (SRS) to the neighboring base station, the neighboring base station configured to decode the SRS to obtain scheduling assignment information regarding the communication resources to be used by the AV-UE for uplink data transmissions.

13. The AV-UE of claim 12, wherein the transmitter is further configured to transmit the SRS using a set of subcarriers that will be used for an upcoming uplink data transmission.

14. The AV-UE of claim 12, wherein the transmitter is further configured to transmit a specific sequence that implicitly conveys information regarding the communication resources that will be used for an upcoming uplink data transmission.

15. The AV-UE of claim 11, wherein the neighboring base station is configured to mitigate interference from the AV-UE uplink data transmissions.

16. The AV-UE of claim 11, wherein the transmitter is further configured to transmit scheduling assignment information regarding the communication resources to the neighboring base station.

17. The AV-UE of claim 16, wherein the transmitter is further configured to add at least one of the following to a transmission of the scheduling assignment information: a preamble, an additional reference signal, an extended cyclic prefix, and a timing advance.

* * * * *